United States Patent
Zeng et al.

(10) Patent No.: US 10,469,652 B2
(45) Date of Patent: Nov. 5, 2019

(54) MOBILE TERMINAL, METHOD FOR MOBILE TERMINAL TO SET FONT DISPLAY STATE, AND STORAGE MEDIUM

(71) Applicant: ZTE Corporation, Shenzhen, Guangdong (CN)

(72) Inventors: Huipeng Zeng, Shenzhen (CN); Daojing He, Shenzhen (CN); Simin Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 318 days.

(21) Appl. No.: 15/511,022

(22) PCT Filed: Dec. 15, 2014

(86) PCT No.: PCT/CN2014/093874
§ 371 (c)(1),
(2) Date: Mar. 14, 2017

(87) PCT Pub. No.: WO2015/131604
PCT Pub. Date: Sep. 11, 2015

(65) Prior Publication Data
US 2019/0158651 A1    May 23, 2019

(30) Foreign Application Priority Data
Sep. 19, 2014    (CN) .......................... 2014 1 0484625

(51) Int. Cl.
*H04M 1/725* (2006.01)
*G01P 15/00* (2006.01)
*G09G 5/00* (2006.01)

(52) U.S. Cl.
CPC ....... *H04M 1/72569* (2013.01); *G01P 15/001* (2013.01); *G09G 5/003* (2013.01);
(Continued)

(58) Field of Classification Search
CPC .......... H04M 1/72569; H04M 2250/12; G09G 5/003; G09G 2320/08; G09G 2320/0261;
(Continued)

(56) References Cited

U.S. PATENT DOCUMENTS 9,430,450 B1 *   8/2016   Blinn .................... G06F 17/214
2008/0254837 A1 * 10/2008   Klinghult .......... H04M 1/72594
                                                          455/566

(Continued)

FOREIGN PATENT DOCUMENTS

CN        102239471 A       11/2011
CN        102541254 A        7/2012
(Continued)

OTHER PUBLICATIONS

International Search Report in international application No. PCT/CN2014/093874, dated Jun. 4, 2015, 2 pgs.
(Continued)

*Primary Examiner* — Nitin Patel
*Assistant Examiner* — Amy Onyekaba

(57) ABSTRACT

Disclosed are a mobile terminal, a method for the mobile terminal to set a font display state, and a storage medium. The method may comprise: acquiring, by a mobile terminal, a current shake level; searching, by the mobile terminal, a corresponding relationship between a shake level and a font display state according to the current shake level, to acquire a font display state corresponding to the current shake level of the mobile terminal; and setting, by the mobile terminal, a default font display state as the font display state corresponding to the current shake level of the mobile terminal.

9 Claims, 3 Drawing Sheets

(52) U.S. Cl.
CPC ............... *H04M 1/72519* (2013.01); *G09G 2320/0261* (2013.01); *G09G 2320/08* (2013.01); *H04M 1/72594* (2013.01); *H04M 2250/12* (2013.01)

(58) Field of Classification Search
CPC ... G09G 3/3406; G01P 15/001; G06F 17/214; G01C 21/367
See application file for complete search history.

(56) References Cited

U.S. PATENT DOCUMENTS

| | | | | |
|---|---|---|---|---|
| 2009/0186659 | A1* | 7/2009 | Platzer | G06F 1/1613 455/566 |
| 2010/0103197 | A1* | 4/2010 | Liu | G09G 5/222 345/660 |
| 2011/0208472 | A1* | 8/2011 | Fujiwara | G01P 13/04 702/141 |
| 2012/0081281 | A1* | 4/2012 | Morichika | G01C 21/367 345/156 |
| 2013/0235058 | A1* | 9/2013 | Jaramillo | G09G 5/00 345/589 |
| 2013/0254657 | A1* | 9/2013 | Huang | G06F 17/214 715/268 |
| 2013/0293589 | A1* | 11/2013 | Hwang | G06F 3/0488 345/666 |
| 2015/0177826 | A1* | 6/2015 | Aizawa | G06F 3/01 345/173 |
| 2015/0192424 | A1* | 7/2015 | Kuo | G01C 21/367 701/454 |
| 2015/0212611 | A1* | 7/2015 | Takeda | G06F 3/0488 345/173 |
| 2015/0248378 | A1* | 9/2015 | Nordback | G06F 17/212 715/243 |
| 2015/0296034 | A1* | 10/2015 | Taguchi | G06F 17/2247 715/234 |
| 2016/0259420 | A1* | 9/2016 | Kim | G06F 3/033 |

FOREIGN PATENT DOCUMENTS

| | | |
|---|---|---|
| CN | 103176623 A | 6/2013 |
| CN | 103176694 A | 6/2013 |
| CN | 103200323 A | 7/2013 |
| CN | 103246441 A | 8/2013 |
| CN | 103248749 A | 8/2013 |
| CN | 103309582 A | 9/2013 |
| JP | 2003169125 A | 6/2003 |
| JP | 2005012297 A | 1/2005 |

OTHER PUBLICATIONS

English Translation of the Written Opinion of the International Search Authority in international application No. PCT/CN2014/093874, dated Jun. 4, 2015, 6 pgs.

* cited by examiner

| Font sizes |
| --- |
| Normal font |
| Middle-small font |
| Middle-large font |
| Large font |

| Time period | Acceleration |
| --- | --- |
| the first time period T1 | the first acceleration range absolute value |
| the second time period T2 | at least two second acceleration range absolute values |

MOBILE TERMINAL, METHOD FOR MOBILE TERMINAL TO SET FONT DISPLAY STATE, AND STORAGE MEDIUM

TECHNICAL FIELD

The disclosure relates to the field of mobile terminals, and in particular to a mobile terminal, a method for the mobile terminal to set a font display state, and a storage medium.

BACKGROUND

Currently, a mobile terminal is widely used in daily life of users. During the use of the mobile terminal, for example when a user is on a public transportation, the user cannot see clearly the content on a screen of the terminal because of an external jitter, thereby causing user asthenopia.

SUMMARY

In order to solve the technical problem described above, the disclosure discloses a mobile terminal, a method for the mobile terminal to set a font display state and a storage medium.

The technical solution of the disclosure is implemented as follows.

According to a first aspect, the disclosure discloses a method for a mobile terminal to set a font display state including: a mobile terminal acquires a current jitter level; the mobile terminal searches a correspondence relationship between a jitter level and a font display state according to the current jitter level, to acquire a font display state corresponding to the current jitter level of the mobile terminal; and the mobile terminal sets a default font display state as the font display state corresponding to the current jitter level of the mobile terminal.

According to a second aspect, the disclosure discloses a mobile terminal including an acquiring unit, a searching unit and a setting unit. The acquiring unit is arranged to acquire a current jitter level. The searching unit is arranged to search a correspondence relationship between a jitter level and a font display state according to the current jitter level, to acquire a font display state corresponding to the current jitter level of the mobile terminal. The setting unit is arranged to set a default font display state as the font display state corresponding to the current jitter level of the mobile terminal.

According to a third aspect, the disclosure discloses a computer storage medium storing a computer program for performing the method for a mobile terminal to set a font display state as described above.

The disclosure discloses a mobile terminal, a method for the mobile terminal to set a font display state, and a storage medium. A jitter degree of a mobile terminal is acquired and a font state displayed on the screen of the mobile terminal is set according to the jitter degree. Thus a user can see the content on the screen of the mobile terminal clearly when external jitter exists, and the user asthenopia can be avoided.

DETAILED DESCRIPTION

The technical solution in embodiments of the disclosure will be described clearly and completely below with reference to the drawings in the embodiments of the disclosure.

In the embodiments of the disclosure, a jitter degree of a mobile terminal is acquired at first, and then a font state displayed on the mobile terminal screen is correspondingly set according to the jitter degree. The font state may include, but not limited to a font size, a font type and a font color etc. The embodiments of the disclosure are described with the font size (in FIG. 5) being as an example. It will be understood that other font states may be set according to the technical solution in embodiments of the disclosure.

Figure 1:
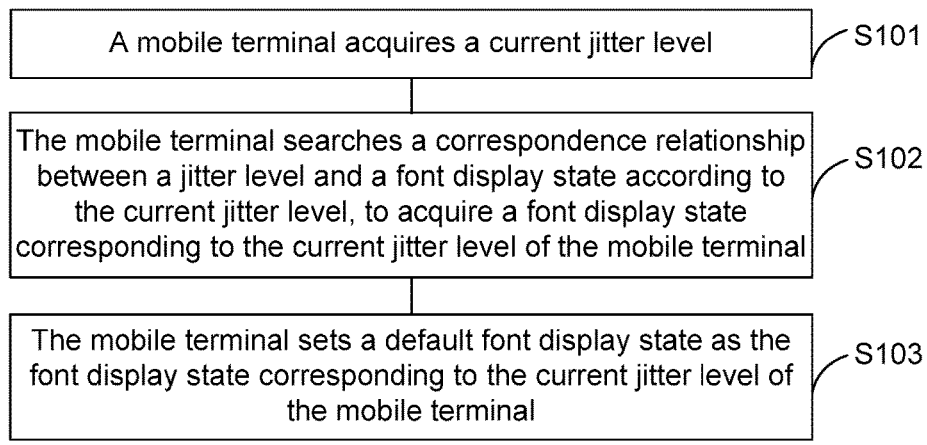
FIG. 1 is a flowchart of a method for a mobile terminal to set a font display state.

Refer to FIG. 1 which shows a method for a mobile terminal to set a font display state according to an embodiment of the disclosure. The method may be used in a mobile terminal. For example, rather than limit, the mobile terminal may include, but not limited to a portable terminal device such as a phone, a tablet computer or a notebook computer etc. The method may include the following steps.

At step S101, a mobile terminal acquires a current jitter level. It is important to note that the current jitter level is a basis for setting a font display state. Only if the jitter level is acquired accurately, the font state as which the font display state should be set can be determined.

Figure 2:
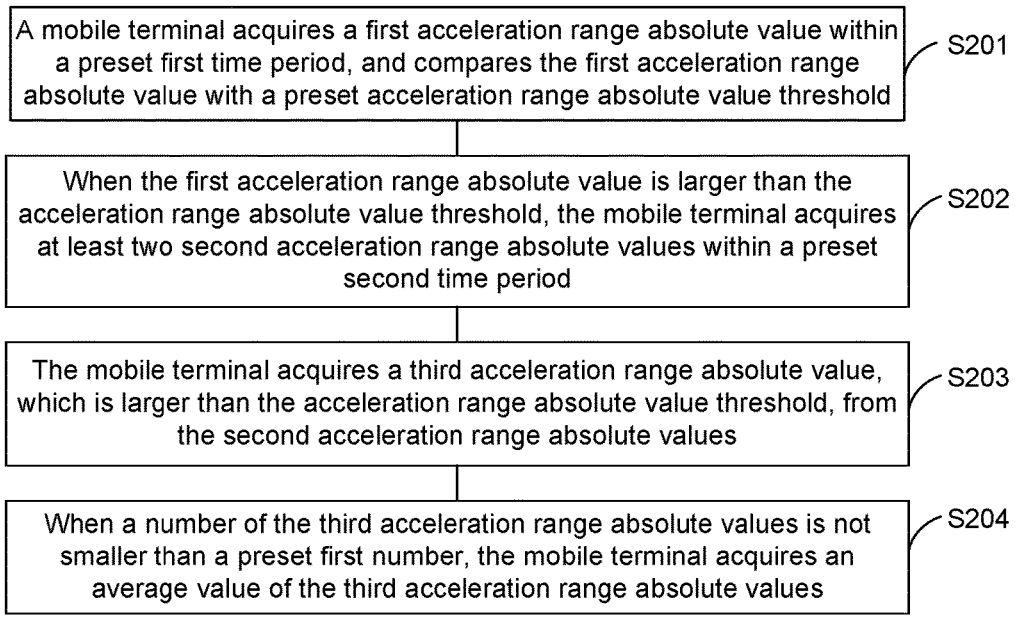
FIG. 2 is a flowchart of a method for a mobile terminal to acquire a current jitter level.

For example, as shown in FIG. 2, the mobile terminal acquiring the current jitter level may include steps S201-S204.

At step S201, the mobile terminal acquires a first acceleration range absolute value within a preset first time period (in FIG. 6), and compares the first acceleration range absolute value with a preset acceleration range absolute value threshold. It is important to note that the step S201 is used for judging whether the jitter is caused by an external shake, which is a necessary condition for acquiring the current jitter level. Thus, the acceleration range absolute value threshold may be set to judge whether the jitter is caused by the external shake.

Alternatively, the mobile terminal acquiring the first acceleration range absolute value within the preset first time period may include the following steps. Firstly, the mobile terminal detects and acquires two accelerations, i.e. a first original acceleration and a second original acceleration, within the preset first time period through a built-in acceleration sensor. Then, the first original acceleration and the second original acceleration are processed through a low-pass filter, to acquire a first acceleration median and a second acceleration median, respectively. Then, the first acceleration median and the second acceleration median are processed through a high-pass filter, to acquire a first acceleration and a second acceleration, respectively. At last, an absolute value computation is implemented on a difference value between a module value of the first acceleration and a module value of the second acceleration, to acquire the first acceleration range absolute value.

It is important to note that the preset first time period T1 is a time interval between the two acceleration detections of the acceleration sensor, which may be set in default by a system, or set by a user. The first original acceleration and the second original acceleration detected and acquired by the acceleration sensor may be represented by a vector synthesis of acceleration components on three orthogonal coordinate axis.

Generally, the first original acceleration and the second original acceleration may be interfered by gravity. Thus, preferably, in the embodiment, the first original acceleration and the second original acceleration are processed by the mobile terminal through the low-pass filter, then the first acceleration median and the second acceleration median are processed through the high-pass filter, to acquire the first acceleration and the second acceleration respectively. In such a way, the interference of the gravity may be eliminated. It will be understood that the first acceleration and the second acceleration may also be represented by the vector synthesis of acceleration components on three orthogonal coordinate axis. In the embodiment, the module value of the first acceleration can be represented as follows:

$$a_1=\sqrt{x_1^2+y_1^2+z_1^2}$$

where, $a_1$ is the module value of the first acceleration in a unit of m/s$^2$, $x_1$ is a component value of the first acceleration in x-axis direction, $y_1$ is a component value of the first acceleration in y-axis direction, $z_1$ is a component value of the first acceleration in z-axis direction, and units of $x_1$, $y_1$ and $z_1$ are m/s$^2$.

Correspondingly, the module value of the second acceleration can be represented as follows:

$$a_2=\sqrt{x_2^2+y_2^2+z_2^2}$$

where, $a_2$ is the module value of the second acceleration in a unit of m/s$^2$; $x_2$ is a component value of the second acceleration in x-axis direction, $y_2$ is a component value of the second acceleration in y-axis direction, $z_2$ is a component value of the second acceleration in z-axis direction, and units of $x_2$, $y_2$ and $z_2$ are m/s$^2$.

Preferably, the first acceleration range absolute value can be obtained through the following formula:

$$a=|a_2-a_1|$$

where, a is the first acceleration range absolute value, $a_1$ is the module value of the first acceleration, $a_2$ is the module value of the second acceleration, and units of a, $a_1$ and $a_2$ are m/s$^2$.

Figures 4, 5, 6:
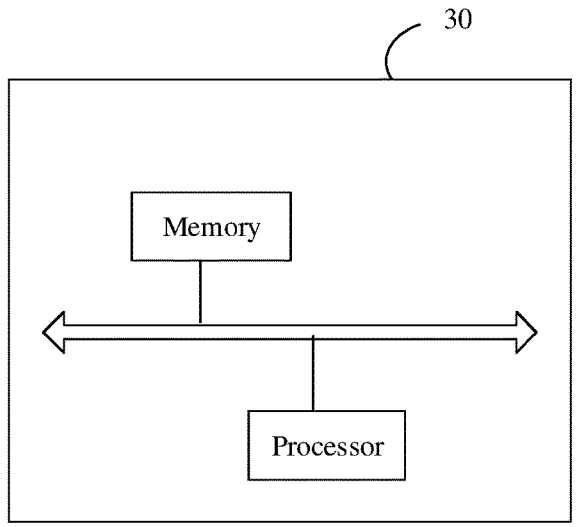
FIG. 4 is a block diagram of a mobile terminal according to an embodiment of the disclosure.
FIG. 5 is a block diagram of font sizes according to an embodiment of the disclosure.
FIG. 6 is a table showing acceleration with respect to time periods according to an embodiment of the disclosure.

At step S202, when the first acceleration range absolute value is larger than the acceleration range absolute value threshold, the mobile terminal acquires at least two second acceleration range absolute values within a preset second time period (in FIG. 6). It is important to note that when the first acceleration range absolute value is larger than the acceleration range absolute value threshold, it may be determined that the jitter is caused by the external environment. Subsequently, it is needed to detect the duration time of the jitter. For example, in the embodiment, the mobile terminal acquires N second acceleration range absolute values within the second time period T2, where N≥2. It will be understood that the second acceleration range absolute values is acquired in the same way as the first acceleration range absolute value is acquired in S201, and will not be repeated here again.

At step S203, the mobile terminal acquires a third acceleration range absolute value, which is larger than the acceleration range absolute value threshold, from the second acceleration range absolute values. In the embodiment, among N second acceleration range absolute values, the mobile terminals may count a number of the second acceleration range absolute values larger than the acceleration range absolute value threshold, to acquire M third acceleration range absolute values, where M≥1.

At step S204, when the number of the third acceleration range absolute values is not smaller than a preset first number, the mobile terminal acquires an average value of the third acceleration range absolute values. It is important to note that in the embodiment, the mobile terminal compares M with the preset first number, and when M is smaller than the preset first number, it means that the jitter occurs occasionally or the jitter degree is not violent. At this point, there is no need for the mobile terminal to adjust the font display state. When M is not smaller than the preset first number, it means that the jitter is not occasional, but lasts for a certain time and has affected the reading of the user. At this point, the jitter degree is evaluated through the average value of the third acceleration range absolute values, which is a worst estimation of the jitter level.

Alternatively, for those skilled in the art, it is possible to evaluate the jitter degree through the last acquired third acceleration range absolute value, which is not repeated here again.

At step S102, the mobile terminal searches a correspondence relationship between the jitter level and the font display state according to the current jitter level, to acquire the font display state corresponding to the current jitter level of the mobile terminal. Preferably, the correspondence relationship between the jitter level and the font display state can be represented by a mapping table shown in table 1, or can be represented by other methods capable of expressing the correspondence relationship, which are not limited in the embodiment:

TABLE 1

| Jitter level | Font display state |
|---|---|
| First jitter level | First font display state |
| Second jitter level | Second font display state |
| Third jitter level | Third font display state |

In the embodiment, it can be seen from S201-S204 that the jitter level is represented by the average value of the third acceleration range absolute values. Thus, preferably, the average value of the third acceleration range absolute values can be correspondingly divided into four sections, which are corresponding to the font display sizes one by one. Thus a correspondence relationship represented in Table 2 is obtained:

TABLE 2

| Acceleration range absolute value (unit: m/s$^2$) | Font display size |
|---|---|
| 0-3 | Normal font |
| 4-6 | Middle-small font |
| 7-9 | Middle-large font |
| 10-12 | Large font |

At step S103, the mobile terminal sets a default font display state as the font display state corresponding to the current jitter level of the mobile terminal.

It is important to note that after the end of the above process, the font display state is changed from the default font display state to a font display state corresponding to the current jitter level. However, in general, the jitter changes over time, and one jitter level will not last for a long time.

In order to adapt to the changes, the font display state needs to be adjusted on time according to changes of the jitter level.

Preferably, when the current font display state of the mobile terminal is not the default font display state, the method further includes: the mobile terminal acquiring at least two fourth acceleration range absolute values within a third time period; when the number of the fourth acceleration range absolute value(s) among at least two fourth acceleration range absolute values larger than the acceleration range absolute value threshold is not smaller than a second preset number, the mobile terminal acquiring an updated jitter level; the mobile terminal searching the correspondence relationship between the jitter level and the font display state according to the updated jitter level, to acquire a font display state corresponding to the updated jitter level of the mobile terminal; and the mobile terminal setting the current font display state to the font display state corresponding to the updated jitter level of the mobile terminal.

It will be understood that a level difference between the font display state corresponding to the updated jitter level of the mobile terminal and the current font display state can be level-skipped. For example, currently displayed normal font size can be set as a middle-large font or a large font, and it will not be repeated here again in the embodiment of the disclosure.

The disclosure discloses a method for a mobile terminal to set a font display state. A jitter degree of the mobile terminal may be acquired and the font state displayed on the mobile terminal screen may be set according to the jitter degree. Thus a user can see the content on the mobile terminal screen clearly when external shake exists, and the user asthenopia can be avoided.

Figure 3:
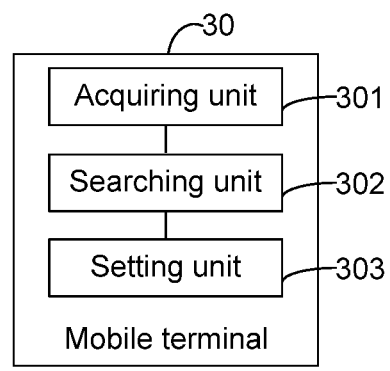
FIG. 3 is a structural diagram of a mobile terminal according to an embodiment of the disclosure.

Based on a technical concept which is the same as the above embodiment, as shown in FIG. 3, a structure of a mobile terminal 30 is provided in the embodiment of the disclosure. For example, rather than limit, the mobile terminal may include, but not limited to, a portable terminal device such as a phone, a tablet computer or a notebook computer etc. The mobile terminal 30 may include an acquiring unit 301, a searching unit 302 and a setting unit 303. The acquiring unit 301 is arranged to acquire a current jitter level. The searching unit 302 is arranged to search a correspondence relationship between a jitter level and a font display state according to the current jitter level acquired by the acquiring unit 301, to acquire a font display state corresponding to the current jitter level. The setting unit 303 is arranged to set a default font display state as the font display state corresponding to the current jitter level obtained by the searching unit 302.

In an example, the acquiring unit 301 is arranged to: acquire a first acceleration range absolute value within a preset first time period, and compare the first acceleration range absolute value with a preset acceleration range absolute value threshold; when the first acceleration range absolute value is larger than the acceleration range absolute value threshold, acquire at least two second acceleration range absolute values within a preset second time period; and acquire a third acceleration range absolute value, which is larger than the acceleration range absolute value threshold, from the second acceleration range absolute values; and when the number of the third acceleration range absolute values is not smaller than a preset first number, acquire an average value of the third acceleration range absolute values.

Correspondingly, the searching unit 302 is arranged to search a correspondence relationship between the acceleration range absolute value and the font display state according to the average value, to acquire the font display state corresponding to the average value.

Preferably, the acquiring unit 301 is arranged to: acquire a first original acceleration and a second original acceleration within the first time period; process the first original acceleration and the second original acceleration through a low-pass filter, to acquire a first acceleration median and a second acceleration median respectively; process the first acceleration median and the second acceleration median through a high-pass filter, to acquire a first acceleration and a second acceleration respectively; and perform an absolute value computation on a difference value between a module value of the first acceleration and a module value of the second acceleration, to acquire the first acceleration range absolute value.

In an example, when the current font display state of the mobile terminal 30 is not the default font display state, the acquiring unit 301 is further arranged to: acquire at least two fourth acceleration range absolute values within a third time period; when the number of the forth acceleration range absolute value(s), which is larger than the acceleration range absolute value threshold, among the at least two fourth acceleration range absolute values is not smaller than a second preset number, acquire an updated jitter level. The searching unit 302 is further arranged to search the correspondence relationship between the jitter level and the font display state according to the updated jitter level acquired by the acquiring unit 301, to acquire the font display state corresponding to the updated jitter level of the mobile terminal. The setting unit 303 is further arranged to set the current font display state as the font display state corresponding to the updated jitter level acquired by the searching unit 302.

The disclosure discloses a mobile terminal. A jitter degree of the mobile terminal is acquired and the font state displayed on the mobile terminal screen is set according to the jitter degree. Thus a user can see the content on the mobile terminal screen clearly when external shake exists, and the user asthenopia can be avoided.

Those skilled in the art should understand that the embodiments of the disclosure can be provided as a method, a system or a computer program product. Thus, forms of hardware embodiments, software embodiments or embodiments integrating software and hardware can be adopted in the disclosure. Moreover, a form of the computer program product implemented on one or more computer available storage media (including, but not limited to, a disk memory, an optical memory and the like) containing computer available program codes can be adopted in the disclosure.

The disclosure is described with reference to flowcharts and/or block diagrams of the method, the equipment (system) and the computer program product according to the embodiments of the disclosure. It should be understood that each flow and/or block in the flowcharts and/or the block diagrams and a combination of the flows and/or the blocks in the flowcharts and/or the block diagrams can be realized by computer program instructions. These computer program instructions can be provided for a general computer, a dedicated computer, an embedded processor or processors of other programmable data processing devices to generate a machine, so that an apparatus (in FIG. 4) for realizing functions assigned in one or more flows of the flowcharts and/or one or more blocks of the block diagrams is generated via instructions executed by the computers or the processors of the other programmable data processing devices.

These computer program instructions can also be stored in a computer readable memory capable of guiding the computers or the other programmable data processing devices to work in a specific mode, so that a manufactured product including an instruction apparatus is generated via the instructions stored in the computer readable memory, and the instruction apparatus realizes the functions assigned in one or more flows of the flowcharts and/or one or more blocks of the block diagrams.

These computer program instructions can also be loaded to the computers or the other programmable data processing devices, so that processing realized by the computers is generated by executing a series of operation steps on the computers or the other programmable devices, and therefore the instructions executed on the computers or the other programmable devices provide a step of realizing the functions assigned in one or more flows of the flowcharts and/or one or more blocks of the block diagrams.

Correspondingly, the disclosure further discloses a computer storage medium, wherein a computer program is stored in it and the computer program is used for performing the method for the mobile terminal to set the font display state in embodiment of the disclosure.

The above description is only the preferred embodiments of the disclosure, not intended to limit the scope of protection of the disclosure.

INDUSTRIAL APPLICABILITY

Based on each embodiment of the disclosure, by acquiring a jitter degree of a mobile terminal and setting a font state displayed on the mobile terminal screen according to the jitter degree, a user can see the content on the mobile terminal screen clearly when external shake exists, and the user asthenopia can be avoided.

What is claimed is:

1. A method for a mobile terminal to set a font display state comprising:
   acquiring, by the mobile terminal, a current jitter level;
   searching, by the mobile terminal, a correspondence relationship between a jitter level and a font display state according to the current jitter level, to acquire a font display state corresponding to the current jitter level of the mobile terminal; and
   setting, by the mobile terminal, a default font display state as the font display state corresponding to the current jitter level of the mobile terminal;
   wherein acquiring, by the mobile terminal, the current jitter level comprises:
      acquiring, by the mobile terminal, a first acceleration range absolute value within a first preset time period, and comparing the first acceleration range absolute value with a preset acceleration range absolute value threshold;
      acquiring, by the mobile terminal, at least two second acceleration range absolute values within a second preset time period when the first acceleration range absolute value is larger than the preset acceleration range absolute value threshold;
      acquiring, by the mobile terminal, a third acceleration range absolute value, which is larger than the preset acceleration range absolute value threshold, from each of the at least two second acceleration range absolute values; and
      acquiring, by the mobile terminal, an average value of the third acceleration range absolute values when a number of the third acceleration range absolute values is not smaller than a first preset number; and
   wherein searching, by the mobile terminal, the correspondence relationship between the jitter level and the font display state according to the current jitter level, to acquire the font display state corresponding to the current jitter level of the mobile terminal, comprises:
      searching, by the mobile terminal, a correspondence relationship between an acceleration range absolute value and the font display state according to the average value, to acquire a font display state corresponding to the average value.

2. The method according to claim 1, wherein acquiring, by the mobile terminal, the first acceleration range absolute value within the first preset time period comprises:
   acquiring, by the mobile terminal, a first original acceleration and a second original acceleration within the first preset time period;
   processing, by the mobile terminal, the first original acceleration and the second original acceleration through a low-pass filter, to acquire a first acceleration median and a second acceleration median, respectively;
   processing, by the mobile terminal, the first acceleration median and the second acceleration median through a high-pass filter, to acquire a first acceleration and a second acceleration, respectively; and
   performing, by the mobile terminal, an absolute value computation on a difference value between a module value of the first acceleration and a module value of the second acceleration, to acquire the first acceleration range absolute value.

3. The method according to claim 1, wherein when a current font display state of the mobile terminal is not the default font display state, the method further comprises:
   acquiring, by the mobile terminal, at least two fourth acceleration range absolute values within a third time period;
   acquiring, by the mobile terminal, an updated jitter level when a number of those larger than the preset acceleration range absolute value threshold among the at least two fourth acceleration range absolute values is not smaller than a second preset number;
   searching, by the mobile terminal, the correspondence relationship between the jitter level and the font display state according to the updated jitter level, to acquire a font display state corresponding to the updated jitter level of the mobile terminal; and
   setting, by the mobile terminal, the current font display state as the font display state corresponding to the updated jitter level of the mobile terminal.

4. A mobile terminal comprising a processor and a memory for storing instructions executable by the processor, wherein the processor is arranged to:
   acquire a current jitter level;
   search a correspondence relationship between a jitter level and a font display state according to the current jitter level, to acquire a font display state corresponding to the current jitter level of the mobile terminal; and
   set a default font display state as the font display state corresponding to the current jitter level of the mobile terminal;
   wherein the processor is further arranged to:
      acquire a first acceleration range absolute value within a first preset time period, and compare the first acceleration range absolute value with a preset acceleration range absolute value threshold;
      acquire at least two second acceleration range absolute values within a second preset time period when the first acceleration range absolute value is larger than the preset acceleration range absolute value threshold;
acquire a third acceleration range absolute value, which is larger than the preset acceleration range absolute value threshold, from each of the at least two second acceleration range absolute values;
acquire an average value of the third acceleration range absolute values when a number of the third acceleration range absolute values is not smaller than a first preset number; and
search a correspondence relationship between an acceleration range absolute value and the font display state according to the average value, to acquire a font display state corresponding to the average value.

5. The mobile terminal according to claim 4, wherein the processor is further arranged to:
acquire a first original acceleration and a second original acceleration within the first preset time period;
process the first original acceleration and the second original acceleration through a low-pass filter, to acquire a first acceleration median and a second acceleration median, respectively;
process the first acceleration median and the second acceleration median through a high-pass filter, to acquire a first acceleration and a second acceleration, respectively; and
perform an absolute value computation on a difference value between a module value of the first acceleration and a module value of the second acceleration, to acquire the first acceleration range absolute value.

6. The mobile terminal according to claim 4, wherein when a current font display state of the mobile terminal is not the default font display state, the processor is further arranged to:
acquire at least two fourth acceleration range absolute values within a third time period;
acquire an updated jitter level when a number of those larger than the preset acceleration range absolute value threshold among the at least two fourth acceleration range absolute values is not smaller than a second preset number;
search the correspondence relationship between the jitter level and the font display state according to the updated jitter level, to acquire a font display state corresponding to the updated jitter level of the mobile terminal; and
set the current font display state as the font display state corresponding to the updated jitter level of the mobile terminal.

7. A non-transitory computer storage medium storing a computer program for performing a method for a mobile terminal to set a font display state, the method comprising:
acquiring, by the mobile terminal, a current jitter level;
searching, by the mobile terminal, a correspondence relationship between a jitter level and a font display state according to the current jitter level, to acquire a font display state corresponding to the current jitter level of the mobile terminal; and
setting, by the mobile terminal, a default font display state as the font display state corresponding to the current jitter level of the mobile terminal;
wherein acquiring, by the mobile terminal, the current jitter level comprises:
acquiring, by the mobile terminal, a first acceleration range absolute value within a first preset time period, and comparing the first acceleration range absolute value with a preset acceleration range absolute value threshold;
acquiring, by the mobile terminal, at least two second acceleration range absolute values within a second preset time period when the first acceleration range absolute value is larger than the preset acceleration range absolute value threshold;
acquiring, by the mobile terminal, a third acceleration range absolute value, which is larger than the preset acceleration range absolute value threshold, from each of the at least two second acceleration range absolute values; and
acquiring, by the mobile terminal, an average value of the third acceleration range absolute values when a number of the third acceleration range absolute values is not smaller than a first preset number; and
wherein searching, by the mobile terminal, the correspondence relationship between the jitter level and the font display state according to the current jitter level, to acquire the font display state corresponding to the current litter level of the mobile terminal, comprises:
searching, by the mobile terminal, a correspondence relationship between an acceleration range absolute value and the font display state according to the average value, to acquire a font display state corresponding to the average value.

8. The non-transitory computer storage medium according to claim 7, wherein acquiring, by the mobile terminal, the first acceleration range absolute value within the first preset time period comprises:
acquiring, by the mobile terminal, a first original acceleration and a second original acceleration within the first preset time period;
processing, by the mobile terminal, the first original acceleration and the second original acceleration through a low-pass filter, to acquire a first acceleration median and a second acceleration median, respectively;
processing, by the mobile terminal, the first acceleration median and the second acceleration median through a high-pass filter, to acquire a first acceleration and a second acceleration, respectively; and
performing, by the mobile terminal, an absolute value computation on a difference value between a module value of the first acceleration and a module value of the second acceleration, to acquire the first acceleration range absolute value.

9. The non-transitory computer storage medium according to claim 7, wherein when a current font display state of the mobile terminal is not the default font display state, the method further comprises:
acquiring, by the mobile terminal, at least two fourth acceleration range absolute values within a third time period;
acquiring, by the mobile terminal, an updated jitter level when a number of those larger than the preset acceleration range absolute value threshold among the at least two fourth acceleration range absolute values is not smaller than a second preset number; and
searching, by the mobile terminal, the correspondence relationship between the jitter level and the font display state according to the updated jitter level, to acquire a font display state corresponding to the updated jitter level of the mobile terminal; and setting, by the mobile terminal, the current font display state as the font display state corresponding to the updated jitter level of the mobile terminal.

\* \* \* \* \*